UNITED STATES PATENT OFFICE.

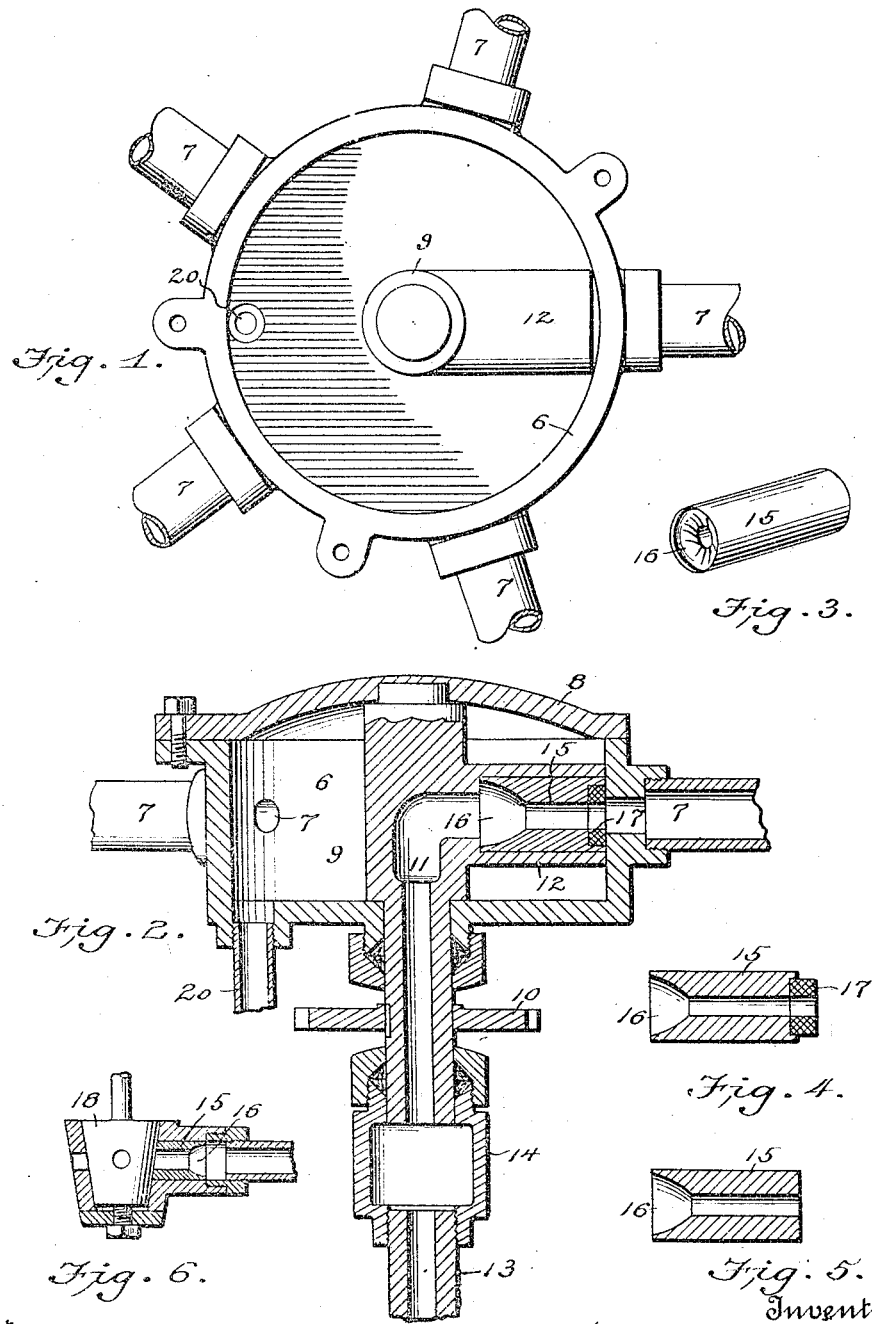

HENRY A. ZURBUCH, OF CHICAGO, ILLINOIS.

VALVE.

No. 825,870.    Specification of Letters Patent.    Patented July 10, 1906.

Application filed April 22, 1905. Serial No. 256,877.

*To all whom it may concern:*

Be it known that I, HENRY A. ZURBUCH, a citizen of the United States, residing at Chicago, in the county of Cook and State of Illinois, have invented new and useful Improvements in Valves, of which the following is a specification.

This invention includes a device for packing a valve, particularly a rotary valve, and is capable of application to either simple or compound valve constructions.

The object of the invention is to produce an improved valve and also one which will tighten or close up as fast as the valve wears, and thus effectually prevent any leak.

A further object of the invention is to produce said result by simple and effective means.

In the accompanying drawings the invention is illustrated in connection both with a compound valve and with a simple valve.

Figure 1 is a plan view of a compound valve with the cover removed. Fig. 2 is a cross-section thereof. Fig. 3 is a perspective view of the packing device. Fig. 4 is a sectional view thereof. Fig. 5 is a sectional view of a modification. Fig. 6 is a sectional view of a simple turning plug provided with the improved packing device.

Referring specifically to the drawings, 6 indicates a cylindrical valve-casing having a plurality of outlets at 7, arranged in the same circumferential line. The casing is closed by a cap 8 on the top. At the center of the casing is a turning tubular plug 9, the bore of which forms the inlet to the valve and which is provided below the valve-casing with a hand or gear wheel 10, whereby it may be turned. The bore 11 of the plug 9 leads out laterally through a tube 12, which extends radially from the plug 9 to the wall of the casing 6 and is adapted to connect with any of the outlets 7 by turning the plug to the desired extent. A turning joint between the supply-pipe 13 and plug 9 is indicated at 14.

The tube 12 is enlarged or cored out to form a seat for the packing-cylinder 15, which fits snugly therein. This cylindrical plug is cupped at the inner end toward the inlet to the valve, as indicated at 16, and preferably has at its other end a ring 17 of fiber or suitable material. Fig. 5 shows it without this ring. It is preferably made of softer metal than the rest of the valve.

The outer end of the plug 15 contacts with the wall of the casing 6 and by reason of the pressure of the fluid against its cupped end 16 is at all times pressed tightly against the wall of the casing. The wear thus comes on this plug, and as the plug wears it slips out in consequence of the pressure behind, and thus remains at all times in tight contact with the wall of the case, insuring a tight joint and preventing leak. Furthermore, it can be renewed at small cost when it becomes worn out, which, however, will obviously take a long time.

In Fig. 6 an application of the invention to a simple turning plug is shown. Said plug is indicated at 18, and the packing-plug 15 is contained in the pipe leading thereto and in contact with the valve-plug, with its cupped end 16 directed toward the inlet, so that the plug is at all times pressed in tight contact with the valve 18, advancing as fast as it wears, and thus preventing leak at the joint.

The form of valve shown in Figs. 1 and 2 is a special valve designed for use in connection with a hydraulic press or special machine, in which after doing its work the water returns through the pipe 7, leading from the valve to one of the pressure chambers or cylinders of the machine, and to carry off the water to waste the valve-casing has an outlet-pipe 20, leading from the bottom thereof.

What I claim as new, and desire to secure by Letters Patent, is—

1. A compound valve comprising a cylindrical casing having a removable cap and a plurality of outlets in a circumferential line around the same, and a turning inlet-pipe at the axis of the casing and spaced from the side thereof and having a radial branch extending to the said wall of the casing and movable to any one of the outlets.

2. A compound valve comprising a casing having a plurality of outlet-pipes leading therefrom, and also a waste or relief outlet arranged to allow the escape of fluid flowing back from any of said pipes, an inlet-pipe leading to the casing, and means to connect the inlet-pipe to any one of the said outlet-pipes.

3. A compound valve comprising a cylindrical casing having a plurality of outlets in a line around the side thereof, a turning pipe at the center of the casing, spaced from said side wall and having a branch extending to said wall and movable to any one of the outlets, and a waste-pipe leading from said space.

4. In combination, a cylindrical valve-casing having a plurality of outlet-ports in a circumferential line around the same, a turning inlet-pipe at the center of the casing, having a radial branch extending toward the wall of the casing, and a packing-plug fitting and movable in the said branch pipe and bearing at its outer end against the wall of the casing.

In testimony whereof I have signed my name to this specification in the presence of two subscribing witnesses.

HENRY A. ZURBUCH.

Witnesses:
 CLARA PROSCHE,
 H. G. BATCHELOR.